US012152433B2

(12) United States Patent
Hales et al.

(10) Patent No.: US 12,152,433 B2
(45) Date of Patent: Nov. 26, 2024

(54) FENESTRATION UNIT WITH SASH RETENTION SYSTEM

(71) Applicant: JELD-WEN, Inc., Charlotte, NC (US)

(72) Inventors: Kyle David Hales, Klamath Falls, OR (US); Shane Michael Meyer, Klamath Falls, OR (US)

(73) Assignee: JELD-WEN, Inc.

( * ) Notice: Subject to any disclaimer, the term of this patent is extended or adjusted under 35 U.S.C. 154(b) by 180 days.

(21) Appl. No.: 17/812,489

(22) Filed: Jul. 14, 2022

(65) Prior Publication Data

US 2024/0018823 A1 Jan. 18, 2024

(51) Int. Cl.
*E06B 3/46* (2006.01)
*E06B 1/36* (2006.01)

(52) U.S. Cl.
CPC .............. *E06B 3/4609* (2013.01); *E06B 1/36* (2013.01)

(58) Field of Classification Search
CPC ................................. E06B 3/4609; E06B 1/36
USPC ......................................................... 52/204.5
See application file for complete search history.

(56) References Cited

U.S. PATENT DOCUMENTS 5,274,955 A * 1/1994 Dallaire ................ E06B 3/4609 49/458
5,622,017 A * 4/1997 Lynn ................. B29C 66/72523 52/204.5
5,918,419 A 7/1999 Cangialosi et al.
6,041,552 A * 3/2000 Lindahl ................. E06B 3/4609 49/458
6,173,541 B1 * 1/2001 Petta ......................... E06B 1/24 52/204.5
7,096,626 B2 8/2006 Heng et al.
7,591,103 B2 9/2009 Tremble et al.
8,245,462 B2 * 8/2012 Miethe ...................... E06B 1/02 52/204.7
8,635,810 B2 1/2014 Deboer et al.
8,640,384 B2 2/2014 Curtis
9,470,036 B2 10/2016 Hodgson et al.
9,650,822 B2 5/2017 Bernhagen et al.
10,156,089 B2 12/2018 Bacon
10,538,948 B1 1/2020 Johnson et al.
10,604,988 B1 3/2020 Johnson et al.
10,774,581 B2 9/2020 Massey
10,876,348 B2 * 12/2020 Kunkel ..................... E06B 3/06
11,015,368 B2 4/2021 Deboer et al.

(Continued)

FOREIGN PATENT DOCUMENTS

CA 2472369 C 1/2006

*Primary Examiner* — Paola Agudelo
(74) *Attorney, Agent, or Firm* — Lorenz & Kopf LLP

(57) ABSTRACT

A fenestration unit includes a fenestration frame with a first frame member, and a sash including a sash frame to support a glazing unit. The fenestration unit includes a channel defined in one of the first frame member and the sash frame that extends along a first axis. The fenestration unit includes a retainer base associated with the other of the first frame member and the sash frame that extends along the first axis. The fenestration unit includes a retainer removably coupled to the first frame member and the sash frame to removably retain the sash frame on the fenestration frame. The retainer has a first retainer arm, a second retainer arm and a third retainer arm. The third retainer arm is movably coupled to the channel and the first retainer arm is movably coupled to the retainer base.

20 Claims, 10 Drawing Sheets

(56) References Cited

U.S. PATENT DOCUMENTS

| | | | | |
|---|---|---|---|---|
| 2007/0157520 | A1* | 7/2007 | Daniels | E06B 3/44<br>49/185 |
| 2010/0018123 | A1 | 1/2010 | Hendrickson | |
| 2013/0312342 | A1* | 11/2013 | Joray | E06B 3/26347<br>52/204.5 |
| 2014/0041326 | A1* | 2/2014 | Kadavy | E06B 7/22<br>49/476.1 |
| 2015/0128521 | A1* | 5/2015 | Vandervelden | E06B 3/5409<br>52/656.5 |
| 2019/0226270 | A1 | 7/2019 | Hoogland et al. | |
| 2020/0240202 | A1 | 7/2020 | Mangat | |
| 2021/0156192 | A1 | 5/2021 | Meyer | |
| 2021/0332636 | A1 | 10/2021 | Pfitzenmaier | |

* cited by examiner

FENESTRATION UNIT WITH SASH RETENTION SYSTEM

TECHNICAL FIELD

The present disclosure generally relates to fenestration units, and more particularly relates to a fenestration unit having a sash retention system.

BACKGROUND

A fenestration unit, such as a window, sliding window, slider door, etc., may include a frame that supports one or more other components of the unit. For example, the fenestration unit may include a frame that supports a sash, which in turn supports a glazing unit. The sash is generally securely coupled to the frame to withstand weather conditions and intrusion. The sash may be fixed to the frame so as to be immovable once coupled to the frame, or the sash may be an active component of the fenestration unit such that the sash moves relative to the frame, to enable the fenestration unit to be opened or closed. In certain instances, for cleaning or general maintenance, it may be desirable to remove the sash from the frame.

Accordingly, it is desirable to provide a fenestration unit with a sash retention system, which enables the sash to be removed from a frame of the fenestration unit for cleaning or general maintenance. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a fenestration unit. The fenestration unit includes a fenestration frame with a first frame member, and a sash including a sash frame configured to support a glazing unit. The fenestration unit includes a channel defined in one of the first frame member and the sash frame that extends along a first axis. The fenestration unit includes a retainer base associated with the other of the first frame member and the sash frame that extends along the first axis. The fenestration unit includes a retainer removably coupled to the first frame member and the sash frame to removably retain the sash frame on the fenestration frame. The retainer has a first retainer arm, a second retainer arm and a third retainer arm. The third retainer arm is movably coupled to the channel and the first retainer arm is movably coupled to the retainer base.

The retainer base defines opposed retainer channels, and the first retainer arm and the second retainer arm are coupled to a respective one of the opposed retainer channels. The channel is defined in the first frame member and the retainer base is coupled to the sash frame. The channel is defined in the first frame member and the channel includes a wall having a terminal end that cooperates with the third retainer arm to enable the sash to move relative to a second axis while coupled to the fenestration frame. The third retainer arm defines a hook to engage with the terminal end of the wall. The terminal end of the wall of the channel includes a bulbous portion to engage with the hook of the third retainer arm. The channel is defined in the sash frame and the retainer base is defined by the first frame member. The third retainer arm is substantially planar. The fenestration unit includes a second frame member and a second sash frame, the second frame member includes a second channel that extends along the first axis, the second sash frame includes a second retainer base and a second retainer is removably coupled to the second frame member and the second sash frame to removably retain the second sash frame on the fenestration frame. The fenestration frame includes a head, a sill and a pair of jambs that interconnect the head to the sill, and the first frame member is coupled to the head of the fenestration frame. The sash frame is coupled to the fenestration frame by the retainer and the sash is immovable relative to the fenestration frame. The sash frame is coupled to the fenestration frame by the retainer and the sash is movable relative to the fenestration frame. The fenestration unit includes a retention fastener configured to enable selective removal of the retainer from the channel and the retainer base to thereby release the sash from the fenestration frame, and the retention fastener is coupled to the retainer base to retain the retainer within the channel.

Also provided is a fenestration unit that includes a fenestration frame with a first frame member that defines a channel that extends along a first axis. The fenestration unit includes a sash having a sash frame including a retainer base that extends along the first axis. The retainer base defines opposed retainer channels. The fenestration unit includes a retainer removably coupled to the first frame member and the sash frame to removably retain the sash frame on the fenestration frame. The retainer has a first retainer arm, a second retainer arm and a third retainer arm. The third retainer arm is movably coupled to the channel, and the first retainer arm and the second retainer arm are movably coupled to a respective one of the opposed retainer channels of the retainer base. The fenestration unit includes a retention fastener configured to enable selective removal of the retainer from the channel and the retainer base to thereby release the sash from the fenestration frame.

The channel includes a wall having a terminal end that cooperates with the third retainer arm to enable the sash to move relative to a second axis while coupled to the fenestration frame. The third retainer arm defines a hook to engage with the terminal end of the wall. The terminal end of the wall of the channel includes a bulbous portion to engage with the hook of the third retainer arm. The fenestration frame includes a head, a sill and a pair of jambs that interconnect the head to the sill, and the first frame member is coupled to the head of the fenestration frame. The sash frame is coupled to the fenestration frame by the retainer and the sash is immovable relative to the fenestration frame. The sash frame is coupled to the fenestration frame by the retainer and the sash is movable relative to the fenestration frame.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of fenestration unit having a sash that would benefit from a sash retention system and the use of the sash retention system with a sliding window, such as a horizontally sliding window, described herein is merely one exemplary embodiment according to the present disclosure. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. Also, as used herein, the term "about" denotes within 10% to account for manufacturing tolerances.

Figure 1:
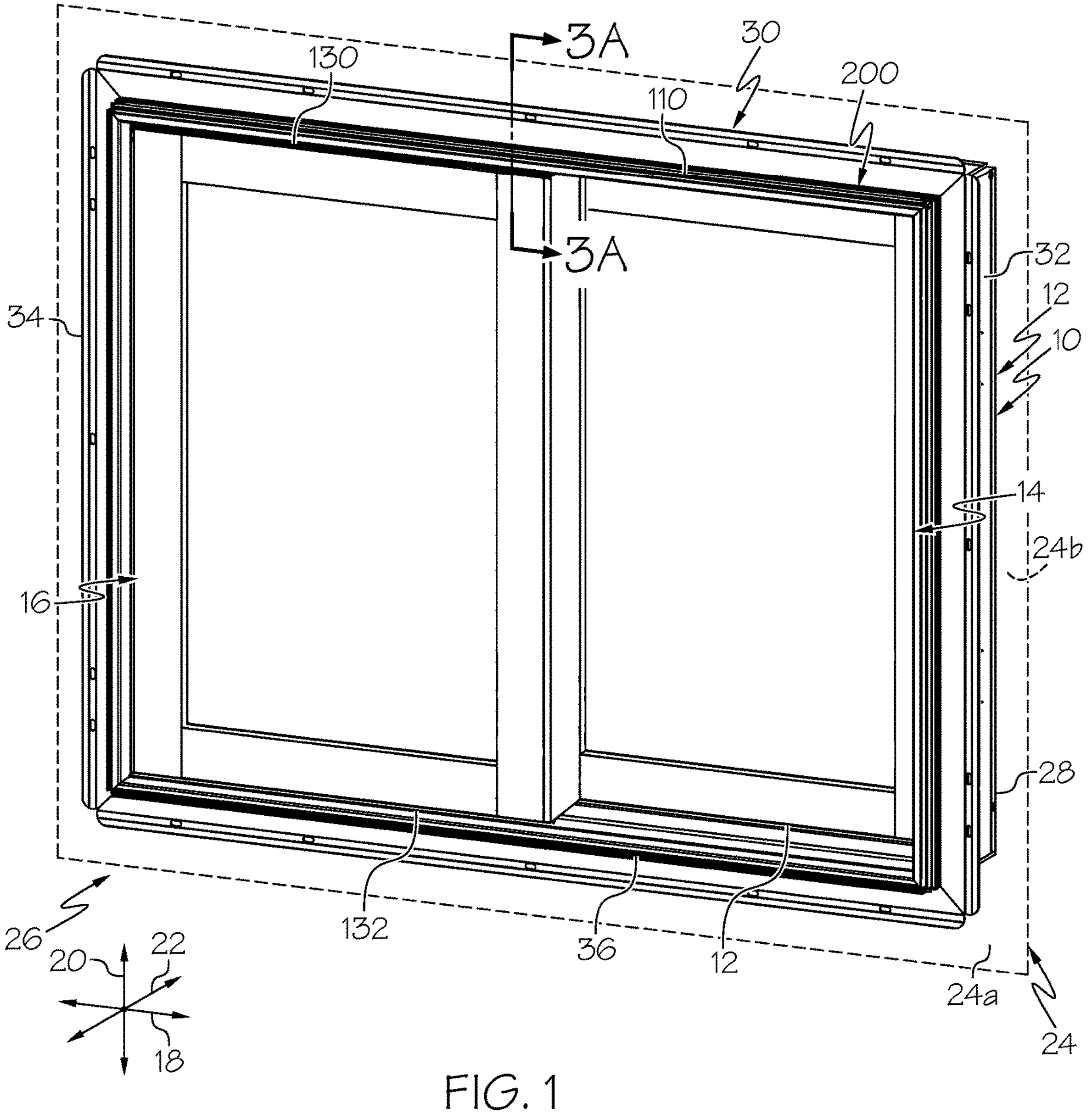
FIG. 1 is a schematic perspective illustration of a fenestration unit, such as a horizontal sliding window, which includes an exemplary sash retention system in accordance with the various teachings of the present disclosure.

With reference to FIG. 1, a fenestration unit 10 including a sash retention system 200 is shown. In this example, the fenestration unit 10 is a sliding window, such as a horizontal sliding window. It should be noted, however, that the teachings discussed herein may be applicable to other types of fenestration units, including, but not limited to horizontal sliding doors, etc. Also, the fenestration unit 10 may be a clad window, however, the fenestration unit 10 may have a different configuration. In this example, the fenestration unit 10 includes a fenestration frame 12, a fixed, first sash 14 and a movable, second sash 16. The fenestration frame 12 supports the first sash 14 and the second sash 16. The first sash 14 is a fixed, non-active sash that is fixedly supported within the fenestration frame 12 and is immovable relative to the fenestration frame 12. The second sash 16 is a sliding sash that is supported within the fenestration frame 12 for sliding movement along a lateral or horizontal axis 18 (i.e., horizontal, or lateral direction). A vertical axis 20 is perpendicular to the horizontal axis 18, and an interior/exterior axis 22 is perpendicular to the vertical axis 20 and the horizontal axis 18. The sashes 14, 16 are supported within the fenestration frame 12 and are offset along the interior/exterior axis 22 such that the second sash 16 overlaps the first sash 14. Generally, the second sash 16 is movable between a first position, shown, in which the second sash 16 is closed; a second position, in which the second sash 16 is open to enable ventilation or possibly ingress and egress through the fenestration unit 10; and various positions in between the first position and the second position. When the fenestration unit 10 is coupled to a structure, such as a building 24, an exterior side 26 of the fenestration unit 10 is disposed on an exterior 24*a* of the building 24, while an interior side 28 of the fenestration unit 10 is disposed in an interior 24*b* of the building 24 (see also FIG. 2).

In this example, the fenestration frame 12 is rectangular, and includes a head 30, a first jamb 32, a second jamb 34 and a sill 36. The head 30 is opposite the sill 36. The head 30 and sill 36 extend along the horizontal axis 18 and may be separated or spaced apart along the vertical axis 20. The first jamb 32 is opposite the second jamb 34. The first jamb 32 and the second jamb 34 extend along the vertical axis 20 and are separated or spaced apart along the horizontal axis 18. In one example, the sash retention system 200 is coupled between the head 30 and each of the sashes 14, 16. By coupling the sash retention system 200 to the head 30, the sashes 14, 16 may be released from the head 30, rotated along the interior/exterior axis 22 and removed from the fenestration frame 12. Thus, the sash retention system 200 enables easy removal of the sashes 14, 16 from the fenestration frame 12.

Figure 2:
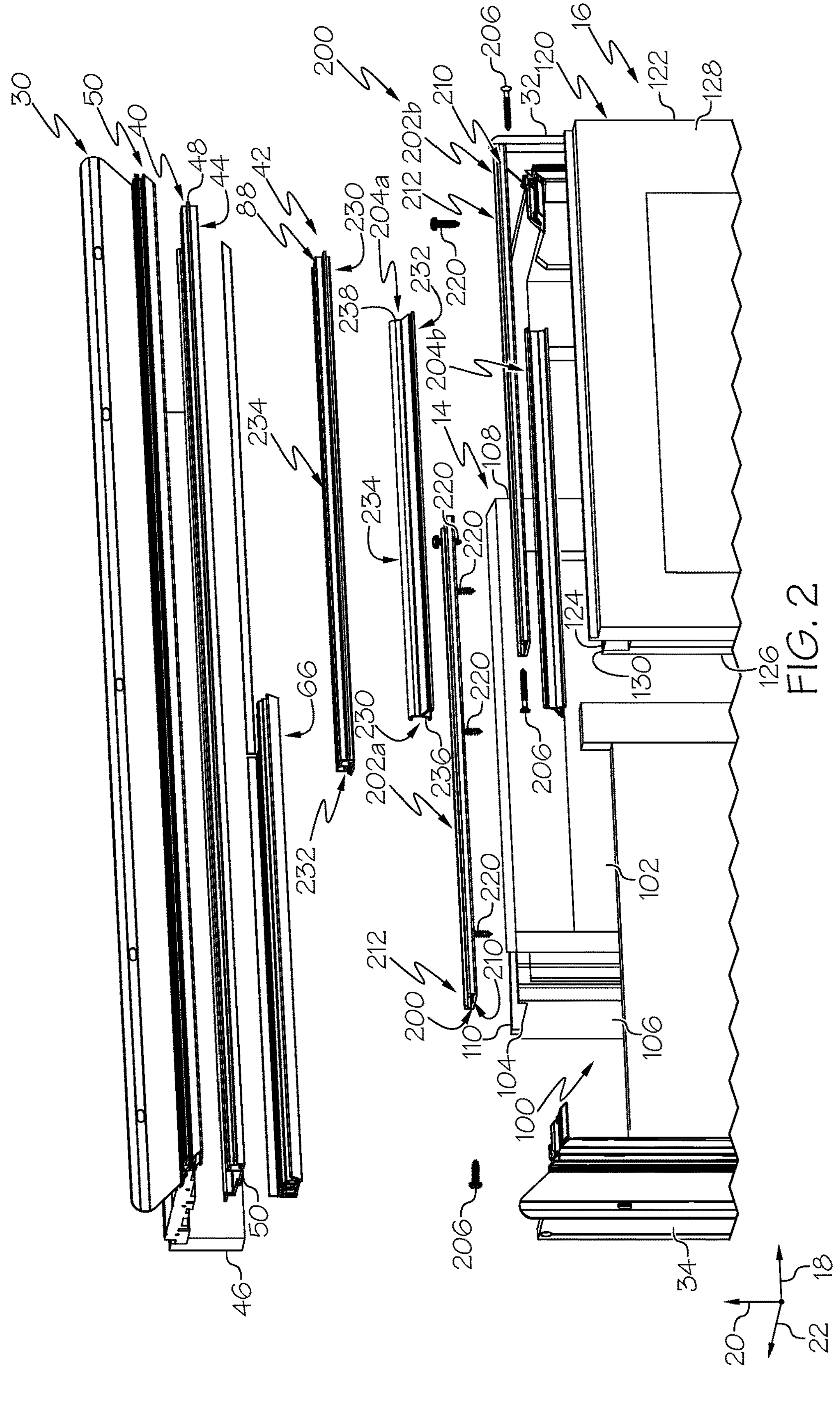
FIG. 2 is a partially exploded view of a portion of the fenestration unit of FIG. 1.
Figure 3A:
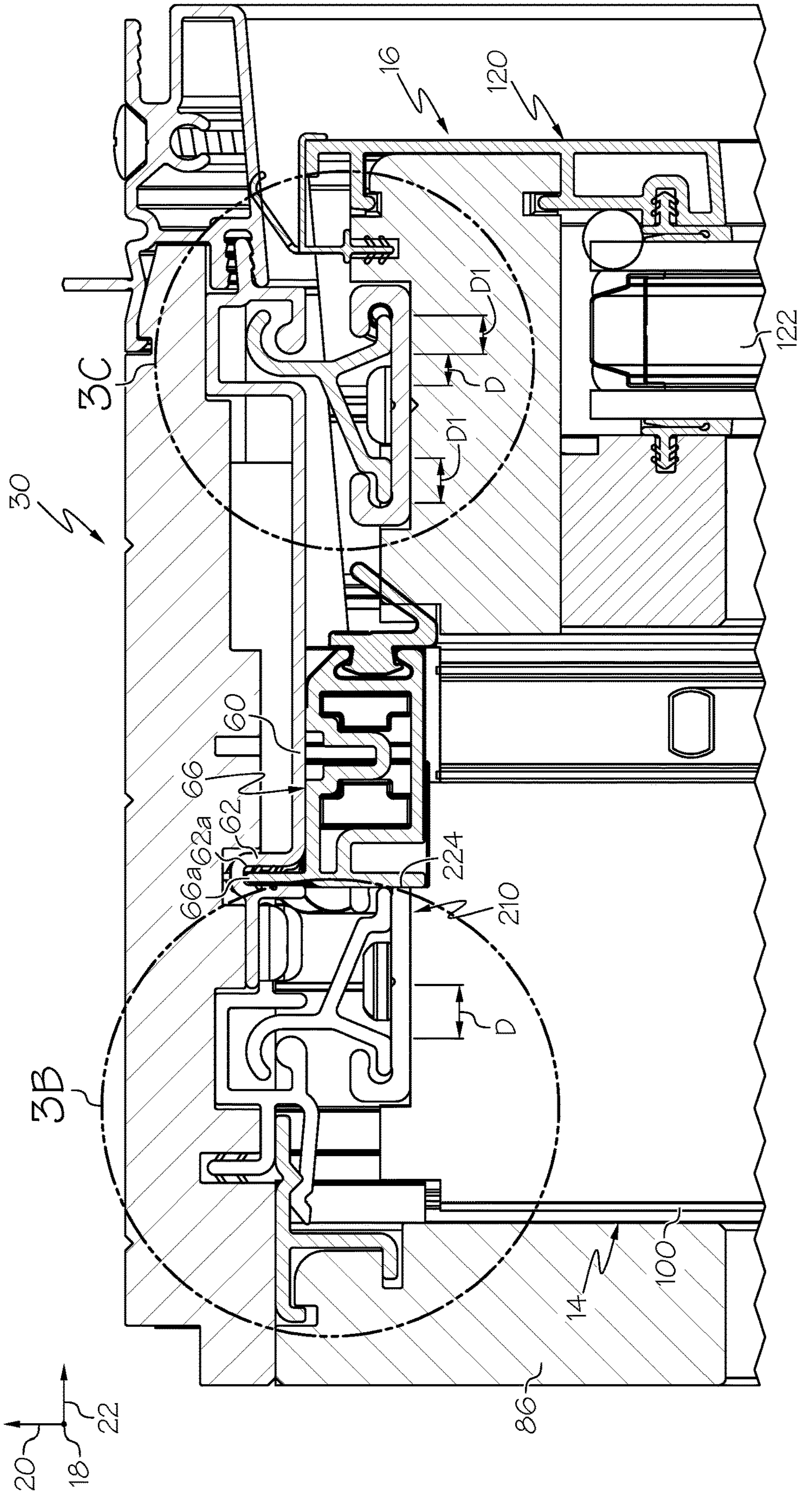
FIG. 3A is a cross-sectional view of the fenestration unit of FIG. 1, taken along line 3A-3A of FIG. 1, which illustrates the sash retention system coupled to a fenestration frame, a first sash frame and a second sash frame of the fenestration unit.
Figure 3B:
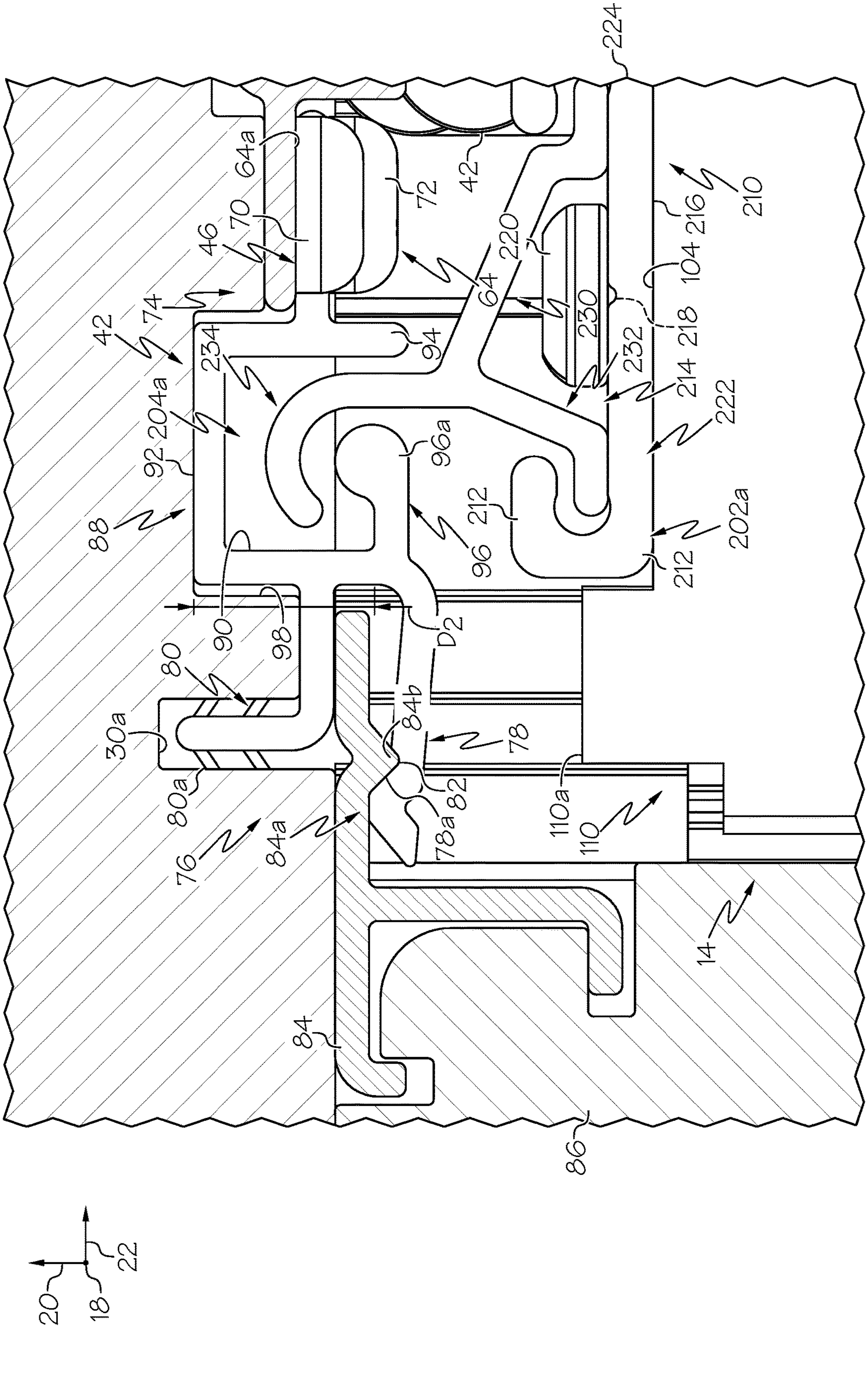
FIG. 3B is a detail cross-sectional view taken at 3B on FIG. 3A.
Figure 3C:
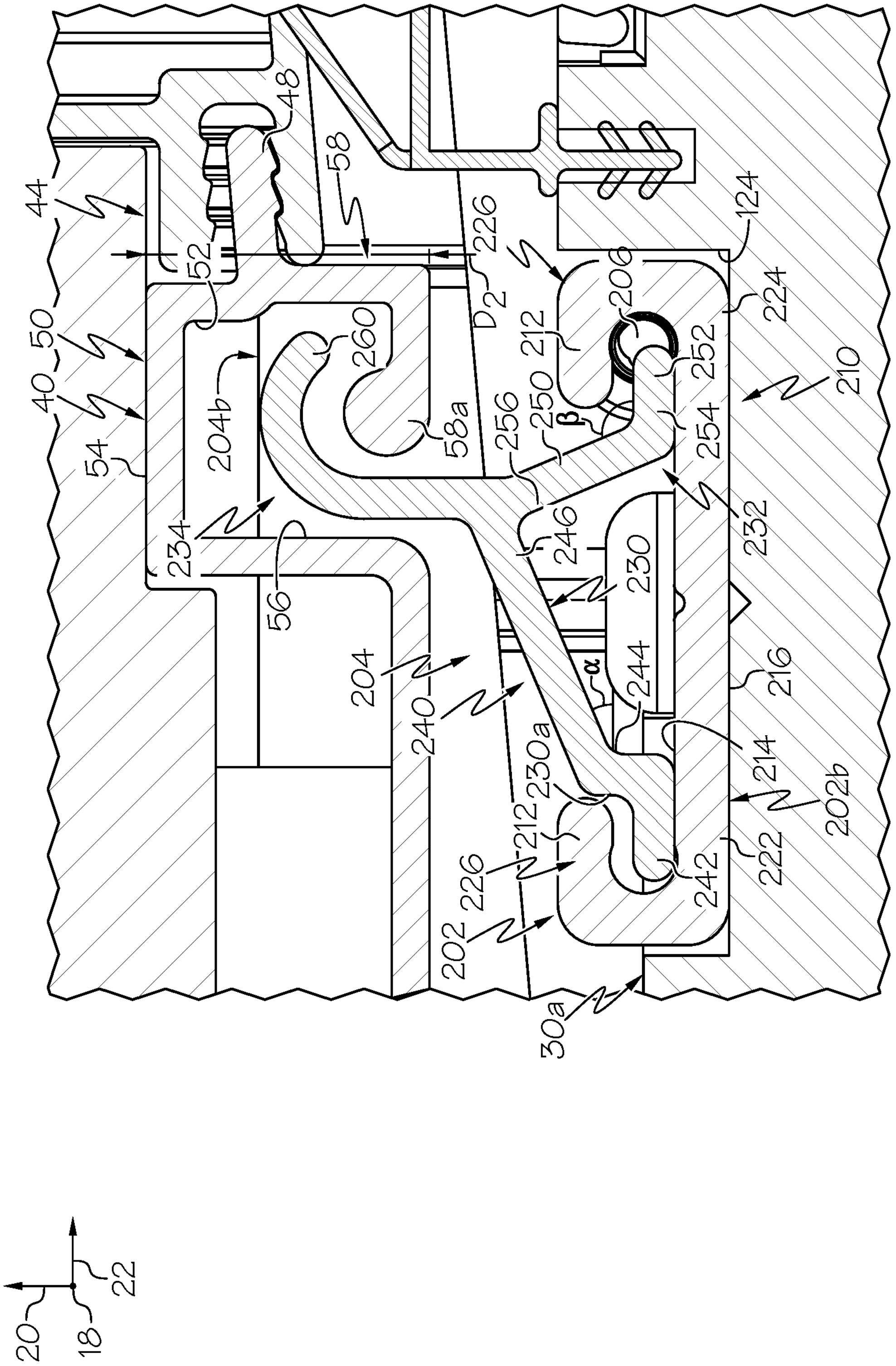
FIG. 3C is a detail cross-sectional view taken at 3C on FIG. 3A.

With additional reference to FIG. 2, a partially exploded view of the fenestration frame 12 and the sash retention system 200 is shown. In FIG. 2, the head 30 is exploded from the first jamb 32 and the second jamb 34, and the sash retention system 200 is also exploded. The head 30 includes a first frame member 40 and a second frame member 42. The first frame member 40 is composed of a metal, metal alloy or composite based material, and is extruded. The first frame member 40 is coupled to the head 30 so as to extend along the head 30 from the first jamb 32 to the second jamb 34. Thus, generally, the first frame member 40 extends along the horizontal axis 18 of the fenestration frame 12. With reference to FIGS. 3A-3C, the first frame member 40 includes a first end 44 and an opposite second end 46 that are spaced apart about the interior/exterior axis 22. The first end 44 includes a coupling tab 48 and a first channel 50. The coupling tab 48 extends outward from the first frame member 40 at the first end 44, and extends axially along the first frame member 40 between the first jamb 32 and the second jamb 34 (FIG. 2). The coupling tab 48 is substantially planar, but may include one or more ribs or roughening features to assist in securing the coupling tab 48 with the head 30.

The first channel 50 is defined at the first end 44, and extends axially along the first frame member 40 between the first jamb 32 and the second jamb 34 (FIG. 2). The first channel 50 includes a first channel wall 52, a second channel wall 54, a third channel wall 56 and a fourth channel wall 58 that cooperate to receive and removably retain a portion of the sash retention system 200. The first channel wall 52 is coupled to or integrally formed with the coupling tab 48, and extends along the vertical axis 20. The second channel wall 54 interconnects the first channel wall 52 and the third channel wall 56. The second channel wall 54 is substantially planar, and is positioned adjacent to the head 30 when the first frame member 40 is coupled to the head 30. The third channel wall 56 is opposite the first channel wall 52, and is spaced apart from the first channel wall 52 by the second channel wall 54. The third channel wall 56 extends along the vertical axis 20, and is coupled to or integrally formed with a frame body portion 60 that interconnects the first end 44 with the second end 46. The fourth channel wall 58 is coupled to or integrally formed with the first channel wall 52, and extends axially inward from an end of the first channel wall 52 toward the third channel wall 56. In this example, the fourth channel wall 58 includes a rounded, bulbous end 58*a*. The bulbous end 58*a* assists in retaining the portion of the sash retention system 200 within the first channel 50 and is the terminal end of the fourth channel wall 58. The bulbous end 58*a* of the fourth channel wall 58 is generally spaced a distance D apart from the third channel wall 56 to define a slot for the receipt of the portion of the sash retention system 200. In one example, the distance D is about 0.125 inches (in.).

The frame body portion 60 is substantially planar, and is coupled to or integrally formed with the first end 44 and the second end 46. The second end 46 includes a seal coupling slot 62 and a second frame coupling slot 64. The seal coupling slot 62 extends axially along the first frame member 40 between the first jamb 32 and the second jamb 34 (FIG. 2). The seal coupling slot 62 defines an opening 62*a* along the vertical axis 20, which is sized to receive a seal coupling tab 66*a* of a seal assembly 66 associated with the fenestration frame 12. The seal coupling slot 62 may include one or more ribs or a roughened surface to assist in coupling the seal coupling tab 66*a* to the first frame member 40. The second frame coupling slot 64 is a terminal end of the first frame member 40. The second frame coupling slot 64 extends axially along the first frame member 40 between the first jamb 32 and the second jamb 34 (FIG. 2). The second frame coupling slot 64 defines an opening 64*a* along the interior/exterior axis 22, which is sized to receive a second coupling tab 70 of the second frame member 42. The second coupling tab 70 may be retained within the opening 64*a* via one or more mechanical fasteners 72, such as screws, bolts, etc.

The second frame member 42 is composed of a metal, metal alloy or composite based material, and is extruded. The second frame member 42 is coupled to the head 30 so as to extend along the head 30 from the first jamb 32 to the second jamb 34 (FIG. 2). Thus, generally, the second frame member 42 extends along the horizontal axis 18 of the fenestration frame 12. The second frame member 42 includes a third end 74 and an opposite fourth end 76 that are spaced apart about the interior/exterior axis 22. The third end 74 includes the second coupling tab 70. The second coupling tab 70 extends outward from the second frame member 42 at the third end 74, and extends axially along the second frame member 42 between the first jamb 32 and the second jamb 34 (FIG. 2). The second coupling tab 70 is substantially planar, and is coupled to the second frame coupling slot 64 of the first frame member 40.

The fourth end 76 defines a coupling arm 78 and a coupling flange 80. The coupling arm 78 extends axially along the second frame member 42 between the first jamb 32 and the second jamb 34 (FIG. 2). The coupling arm 78 cooperates with the coupling flange 80 to define a slot 82. The slot 82 receives a second coupling arm 84*a* of a flange 84 to couple an interior trim piece 86 associated with the fenestration unit 10 to the head 30. The flange 84 is coupled to the interior trim piece 86, and the second coupling arm 84*a* is retained by the second frame member 42 to couple the interior trim piece 86 to the fenestration frame 12. The coupling arm 78 may include a feature, such as a rib 78*a*, which engages with a corresponding feature on the second coupling arm 84*a*, such as a second rib 84*b*, to couple the flange 84 to the second frame member 42. The coupling flange 80 couples the second frame member 42 to the head 30. In one example, the coupling flange 80 includes one or more barbs 80*a*, which assist in securing the coupling flange 80 to the head 30. In one example, the coupling flange 80 is received within and coupled to a head slot 30*a* defined in the head 30.

A second channel 88 is defined between the third end 74 and the fourth end 76. The second channel 88 extends axially along the second frame member 42 from the first jamb 32 toward the second jamb 34 (FIG. 2). In this example, the second channel 88 extends along the horizontal axis 18 for a length of the first sash 14 since the first sash 14 is fixed to the fenestration frame 12 (FIG. 2). The second channel 88 includes a fifth channel wall 90, a sixth channel wall 92, a seventh channel wall 94 and an eighth channel wall 96 that cooperate to receive and removably retain a portion of the sash retention system 200. The fifth channel wall 90 is coupled to or integrally formed with the coupling arm 78 and the coupling flange 80. The fifth channel wall 90 extends along the vertical axis 20. The sixth channel wall 92 interconnects the fifth channel wall 90 and the seventh channel wall 94. The sixth channel wall 92 is substantially planar, and is coupled to or received within a channel slot 98 of the head 30 when the second frame member 42 is coupled to the head 30. The seventh channel wall 94 is opposite the fifth channel wall 90, and is spaced apart from the fifth channel wall 90 by the sixth channel wall 92. The seventh channel wall 94 extends along the vertical axis 20, and is coupled to or integrally formed with the second coupling tab 70. The eighth channel wall 96 is coupled to or integrally formed with the fifth channel wall 90, and extends axially inward from an end of the fifth channel wall 90 toward the seventh channel wall 94. In this example, the eighth channel wall 96 includes a rounded, bulbous end 96*a*. The bulbous end 96*a* assists in retaining the portion of the sash retention system 200 within the second channel 88 and is a terminal end of the eighth channel wall 96. The bulbous end 96*a* of the eighth channel wall 96 is generally spaced the distance D apart from the seventh channel wall 94 to define a slot for the receipt of the portion of the sash retention system 200.

In this example, each of the first channel 50 and the second channel 88 are defined such that the second channel wall 54 and the sixth channel wall 92 are spaced a distance D2 from the bulbous end 58*a*, 96*a* of the respective of the fourth channel wall 58 and the eighth channel wall 96. The distance D2 is predetermined to account for manufacturing tolerances, and to also provide the operator with ease of insertion for the portion of the sash retention system 200. In one example, the distance D2 is about 0.125 inches (in.).

With reference back to FIG. 2, the first sash 14 includes a first sash frame 100 and a first glazing unit 102. The first glazing unit 102 of the first sash 14 is supported by the first sash frame 100, and the first sash frame 100 is fixed relative to the fenestration frame 12. In this example, the first sash frame 100 includes a first retainer groove 104, which extends along the first sash frame 100 from a first sash side 106 to an opposite second sash side 108. Generally, the first retainer groove 104 extends along the horizontal axis 18 at a first sash end 110. The first sash end 110 is opposite a second sash end 112 (FIG. 1). The first sash end 110 is defined on the first sash frame 100 so as to be coupled to the head 30 by the sash retention system 200 when the first sash 14 is coupled to the fenestration frame 12. With reference back to FIGS. 3A-3C, the first retainer groove 104 is substantially U-shaped, and is defined in the first sash end 110 so as to be recessed relative to a surface 110*a* of the first sash end 110. By recessing the first retainer groove 104 into the surface 110*a* of the first sash end 110, the first sash frame 100 may have a lower profile, which enables the use of a larger first glazing unit 102 and thereby may improve a thermal efficiency of the fenestration unit 10. The first glazing unit 102 comprises any suitable glazing unit for a horizontal sliding window, including, but not limited to a single pane of glass, an insulated double-pane glazing unit, tri-pane glazing unit, or any suitable multi-pane glazing unit.

With reference back to FIG. 2, the second sash 16 includes a second sash frame 120 and a second glazing unit 122. The second glazing unit 122 of the second sash 16 is supported by the second sash frame 120, and the second sash frame 120 is movable relative to the fenestration frame 12 between the first position, the second position and positions in-between. In this example, the second sash frame 120 includes a second retainer groove 124, which extends along the second sash frame 120 from a third sash side 126 to an opposite fourth sash side 128. Generally, the second retainer groove 124 extends along the horizontal axis 18 at a third sash end 130. The third sash end 130 is opposite a fourth sash end 132 (FIG. 1). The third sash end 130 is defined on the second sash frame 120 so as to be coupled to the head 30 by the sash retention system 200 when the second sash 16 is coupled to the fenestration frame 12. With reference back to FIGS. 3A-3C, the second retainer groove 124 is substantially U-shaped, and is defined in the third sash end 130 so as to be recessed relative to a surface 130*a* of the third sash end 130. By recessing the second retainer groove 124 into the surface 130*a* of the third sash end 130, the second sash frame 120 may have a lower profile, which enables the use of a larger second glazing unit 122 and thereby may improve a thermal efficiency of the fenestration unit 10. The second glazing unit 122 comprises any suitable glazing unit for a horizontal sliding window, including, but not limited to a single pane of glass, an insulated double-pane glazing unit, tri-pane glazing unit, or any suitable multi-pane glazing unit. Generally, each of the first retainer groove 104 and the second retainer groove 124 are defined in the first sash frame 100 and the second sash frame 120, respectively, such that the first retainer groove 104 and the second retainer groove 124 are substantially centered on the respective sash end 110, 130. It should be noted that the first sash 14 and the second sash 16 may also include additional features that are outside of the scope of the present disclosure, including, but not limited to, one or more seals, operator handles, etc.

The sash retention system 200 enables the first sash 14 and the second sash 16 to be removed from the fenestration frame 12. In this example, the sash retention system 200 is the same between the fixed, first sash 14 and the movable, second sash 16. The sash retention system 200 includes a pair of retainer bases 202, a pair of retainers 204 and at least one or a plurality of retention fasteners 206 (FIG. 2). A retainer base 202*a* of the pair of retainer bases 202 and a retainer 204*a* of the pair of retainers 204 is associated with the first sash frame 100 of the first sash 14, and a retainer base 202*b* of the pair of retainer bases 202 and a retainer 204*b* of the pair of retainers 204 is associated with the second sash frame 120 of the second sash 16. In this example, due to the orientation of the first channel 50, the retainer 204*b* is rotated about 180 degrees relative to the retainer 204*a* for coupling to the first channel 50 and the retainer base 202*b*. With reference back to FIG. 2, the retainer base 202*a* is sized to be received within the first retainer groove 104 of the first sash frame 100, and the retainer base 202*b* is sized to be received within the second retainer groove 124. Each of the retainer base 202*a*, 202*b* are sized to extend within the respective one of the first retainer groove 104 and the second retainer groove 124 from the respective sash side 106, 126 to the opposite respective sash side 108, 126. The retainer bases 202*a*, 202*b* are composed of metal, metal alloy or a polymer-based material, including, but not limited to, aluminum, aluminum alloy or polyvinyl chloride; and are cast, stamped, extruded, additively manufactured, etc.

With reference back to FIGS. 3A-3C, the retainer bases 202*a*, 202*b* each include a base surface 210 and a pair of opposing retainer flanges 212. The base surface 210 is substantially planar, and includes a first base side 214 opposite a second base side 216 in the vertical axis 20. The second base side 216 is coupled to and in contact with the respective one of the first retainer groove 104 and the second retainer groove 124. The base surface 210 includes one or more bores 218 defined through the first base side 214 and the second base side 216. In one example, the base surface 210 defines three of the bores 218 (FIG. 2). Each of the bores 218 receives a mechanical fastener 220 (FIG. 2) to couple the retainer bases 202*a*, 202*b* to the respective one of the first retainer groove 104 and the second retainer groove 124. The mechanical fasteners 220 may comprise self-tapping screws, for example. The base surface 210 also includes a first base end 222 and an opposite second base end 224 along the interior/exterior axis 22. One of the pair of retainer flanges 212 is defined at the first base end 222 and one of the pair of retainer flanges 212 is defined at the second base end 224. The retainer flanges 212 cooperate with the first base side 214 to define opposing retainer channels 226 that receive a portion of the respective retainer 204*a*, 204*b*. Generally, the retainer flanges 212 cooperate with the first base side 214 to define a substantially C-shaped retainer channel 226 at the first base end 222 and the second base end 224. The C-shape of the retainer channel 226 enables the respective retention fasteners 206 to be removably coupled to the retainer base 202*a*, 202*b* and to be received within a portion of the retainer channel 226. The retainer flanges 212 are sized to enable the retainer 204*a*, 204*b* to move or slide within the retainer channels 226 defined by the retainer flanges 212 along the first base side 214. Each of the retainer flanges 212 extends for a distance D1 over a portion of the first base side 214 to couple the respective retainer 204*a*, 204*b* to the retainer base 202*a*, 202*b*. In one example, the distance D1 is about 0.1 inches (in.).

Each of the retainers 204*a*, 204*b* couples or interconnects the respective one of the first sash frame 100 of the first sash 14 and the second sash frame 120 of the second sash 16 to the respective one of the first frame member 40 and the second frame member 42. The retainers 204*a*, 204*b* are composed of metal, metal alloy or polymer-based material, including, but not limited to, aluminum, aluminum alloy or polyvinyl chloride; and may be extruded, molded, additively manufactured, etc. Generally, the retainers 204*a*, 204*b* have a length along the horizontal axis 18, which is different and less than a length of the retainer bases 202*a*, 202*b* along the horizontal axis 18 to enable the retention fasteners 206 to couple the retainers 204*a*, 204*b* to the retainer bases 202*a*, 202*b*. For example, the retainers 204*a*, 204*b* may have a length that is about 250 millimeters (mm) to about four inches (in.) less than a length of the retainer bases 202*a*, 202*b*. In one example, each of the retainers 204*a*, 204*b* includes a first retainer arm 230, a second retainer arm 232 and a third retainer arm 234. Each of the first retainer arm 230, the second retainer arm 232 and the third retainer arm 234 extend axially along the retainer 204*a*, 204*b* from a first retainer side 236 to an opposite second retainer side 238 (FIG. 2). The first retainer arm 230 is coupled to or integrally formed with the second retainer arm 232 and the third retainer arm 234. The first retainer arm 230 extends outwardly along the interior/exterior axis 22 from an intersection of the second retainer arm 232 and the third retainer arm 234. The first retainer arm 230 includes a first angled portion 240 and a first tab 242. The first angled portion 240 extends at an angle α of about 45 degrees defined between a first end 244 of the first angled portion 240 and the interior/exterior axis 22. The first angled portion 240 includes a second end 246, which is opposite the first end 244 and integrally formed with the second retainer arm 232 and the third retainer arm 234. The first angled portion 240 extends at the angle α to enable the retainer 204, 204*b* to move within the retainer base 202*a*, 202*b* without contacting the mechanical fastener 220. The first tab 242 extends outward from the first angled portion 240 and is substantially planar. The first tab 242 is sized to be received within the retainer channel 226 defined by the retainer flange 212 and extends for a length that is about equal to the distance D1. In one example, the first retainer arm 230 also includes a notch 230*a*, which is sized to contact the retainer flange 212 to limit a movement of the retainer 204*a*, 204*b* along the interior/exterior axis 22.

The second retainer arm 232 includes a second angled portion 250 and a second tab 252. The second angled portion 250 extends at an angle β of about 110 degrees defined between a first end 254 of the second angled portion 250 and the interior/exterior axis 22. The second angled portion 250 includes a second end 256, which is opposite the first end 254 and integrally formed with the first retainer arm 230 and the third retainer arm 234. The second angled portion 250 extends at the angle β to enable the retainer 204, 204*b* to move within the retainer base 202*a*, 202*b* without contacting the mechanical fastener 220. The second tab 252 extends outward from the second angled portion 250 and is substantially planar. The second tab 252 is sized to be received within the retainer channel 226 defined by the retainer flange 212 and extends for a length that is about equal to the distance D1. In one example, the angle β of the second angled portion 250 is such that the retainer flange 212 contacts the second angled portion 250 to limit a movement of the retainer 204*a*, 204*b* along the interior/exterior axis 22.

The third retainer arm 234 extends upward, along the vertical axis 20, from the intersection of the second end 246, 256 of the first retainer arm 230 and the second retainer arm 232. The third retainer arm 234 includes a curved, arcuate section or a hook 260. The hook 260 is sized to engage with the bulbous end 58*a*, 96*a* of the respective first frame member 40 or second frame member 42 to couple the first sash frame 100 of the first sash 14 and the second sash frame 120 of the second sash 16 to the head 30. Generally, by configuring the first frame member 40 and the second frame member 42 such that the hook 260 faces toward the interior side 28 or the exterior side 26 of the fenestration unit 10 to engage with the bulbous end 58*a*, 96*a*, in instances of a pressure differential, where the first sash 14 and the second sash 16 may be caused to bow outward, away from the fenestration frame 12, the engagement of the hook 260 and the bulbous end 58*a*, 96*a* enables the first sash 14 and the second sash 16 to bow outward or move along the interior/exterior axis 22 without disconnecting or uncoupling the first sash frame 100 and the second sash frame 120 from the fenestration frame 12. This ensures that the first sash 14 and the second sash 16 remain coupled to the fenestration frame 12 during changes in atmospheric pressure that create a pressure differential, like those caused by a weather event, for example.

Figure 4A:
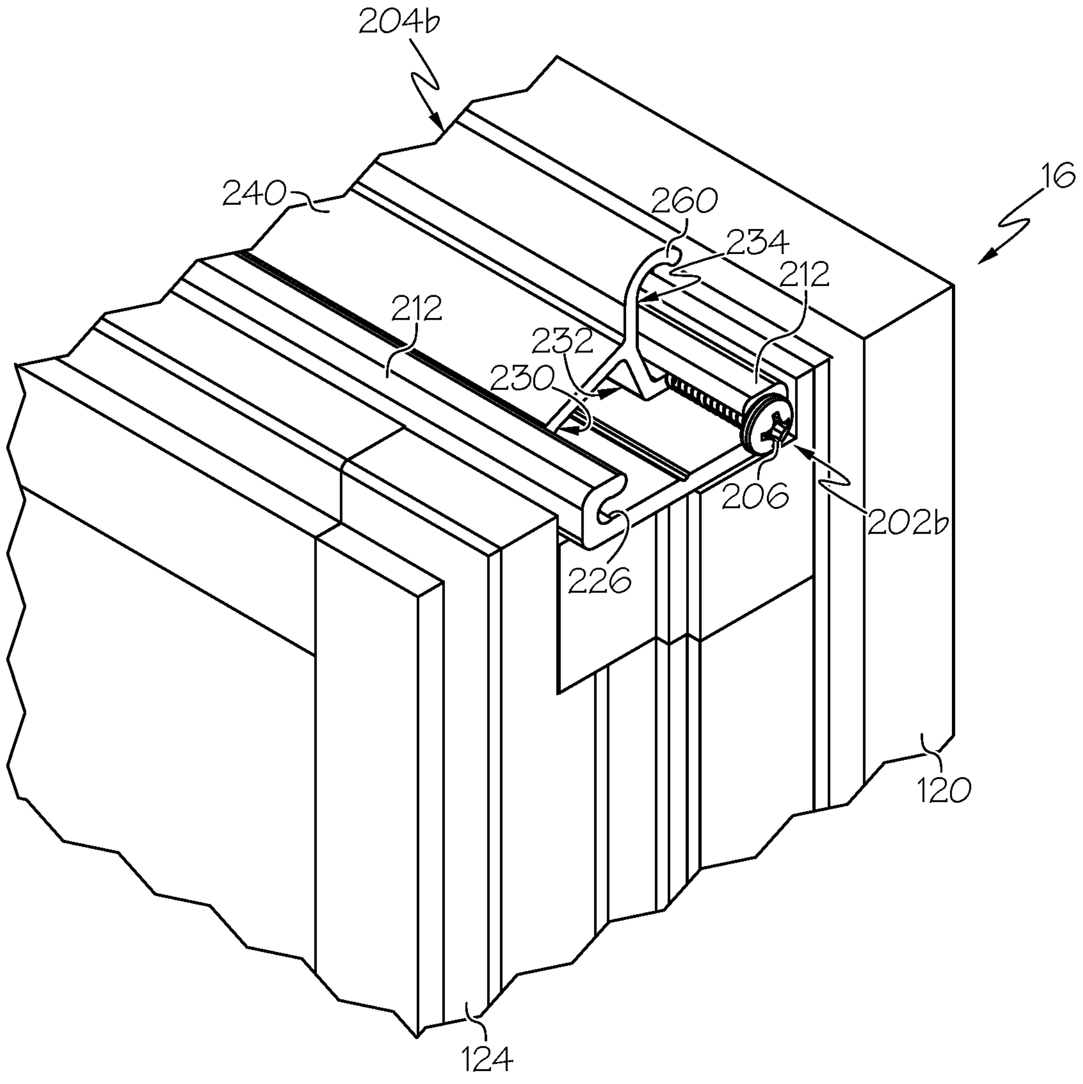
FIG. 4A is a detail perspective view of a portion of the sash retention system coupled to the second sash frame, in which the head has been removed to illustrate a retention fastener of the sash retention system.
Figure 4B:
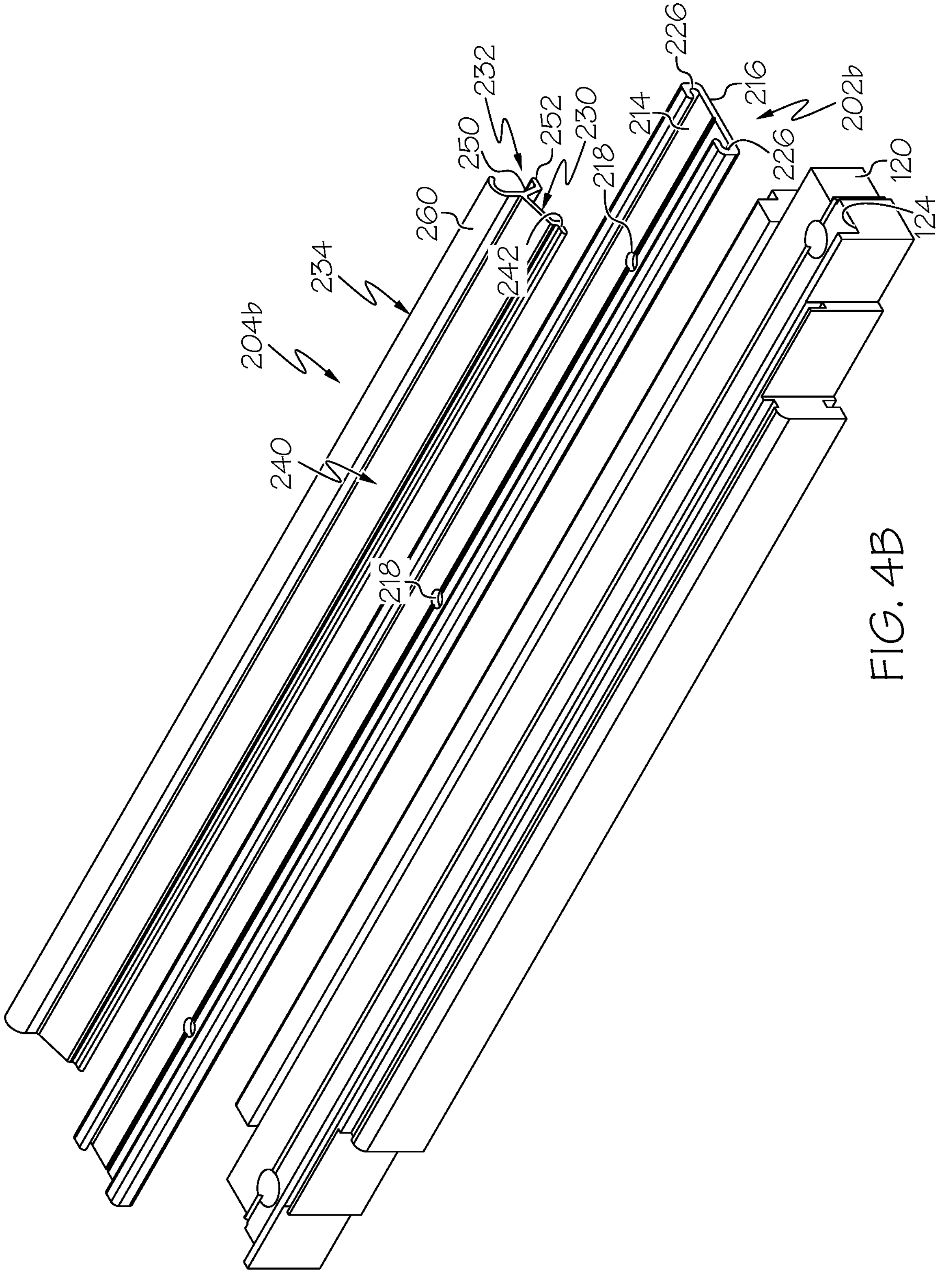
FIG. 4B is an exploded view of the sash retention system associated with the second sash frame.

A pair of the plurality of retention fasteners 206 is coupled to each one of the retainer bases 202*a*, 202*b*. In certain examples, the pair of retention fasteners 206 associated with the retainer base 202*a* may be optional. The retention fasteners 206 bias against the respective retainer 204*a*, 204*b* to inhibit the respective retainer 204*a*, 204*b* from being removed from the respective retainer base 202*a*, 202*b*. In one example, the sash retention system 200 includes four retention fasteners 206, which each comprise a mechanical fastener, such as a bolt. With reference to FIG. 4A, FIG. 4A is a perspective view of the retainer base 202*b* coupled to the second retainer groove 124 of the second sash frame 120, and FIG. 4B is an exploded view. In FIGS. 4A and 4B, the head 30 has been removed, along with the first frame member 40 for clarity. As shown in FIG. 4A, one of the retention fasteners 206 is coupled to the retainer flange 212, which secures the retainer 204*b* within the retainer base 202*b*. In one example, the retention fasteners 206 are coupled to the retainer base 202*b* so as to be in contact with the second retainer arm 232, however, since the retainer flanges 212 are the same, the retention fasteners 206 may alternatively be coupled to the retainer base 202*b* so as to be in contact with the first retainer arm 230. By enabling the retention fasteners 206 to be coupled to either of the retainer flanges 212, the sash retention system 200 provides for ease of assembly and use, by enabling the operator to use the retention fastener 206 with whichever one of the retainer flanges 212 that is convenient to couple the first sash frame 100 and/or second sash frame 120 to the fenestration frame 12. Generally, the retention fasteners 206 are coupled to the retainer base 202*a*, 202*b* at opposed ends of the retainer base 202*a*, 202*b* so as to retain the retainer 204*a*, 204*b* on opposed sides along the horizontal axis 18. As will be discussed, one of the retention fasteners 206 may be removed from the retainer flange 212, which enables the respective retainer 204*a*, 204*b* to be removed from the respective retainer base 202*a*, 202*b* and the respective first frame member 40 and the second frame member 42, which enables the respective one of the first sash frame 100 and the second sash frame 120 to be removed from the fenestration frame 12. Thus, the retention fasteners 206 enable selective removal of the retainer 204*a*, 204*b* from the respective one of the first channel 50, the second channel 88 and the respective retainer base 202*a*, 202*b*, thereby releasing the respective one of the first sash frame 100 and the second sash frame 120 from the fenestration frame 12.

Figure 5A:
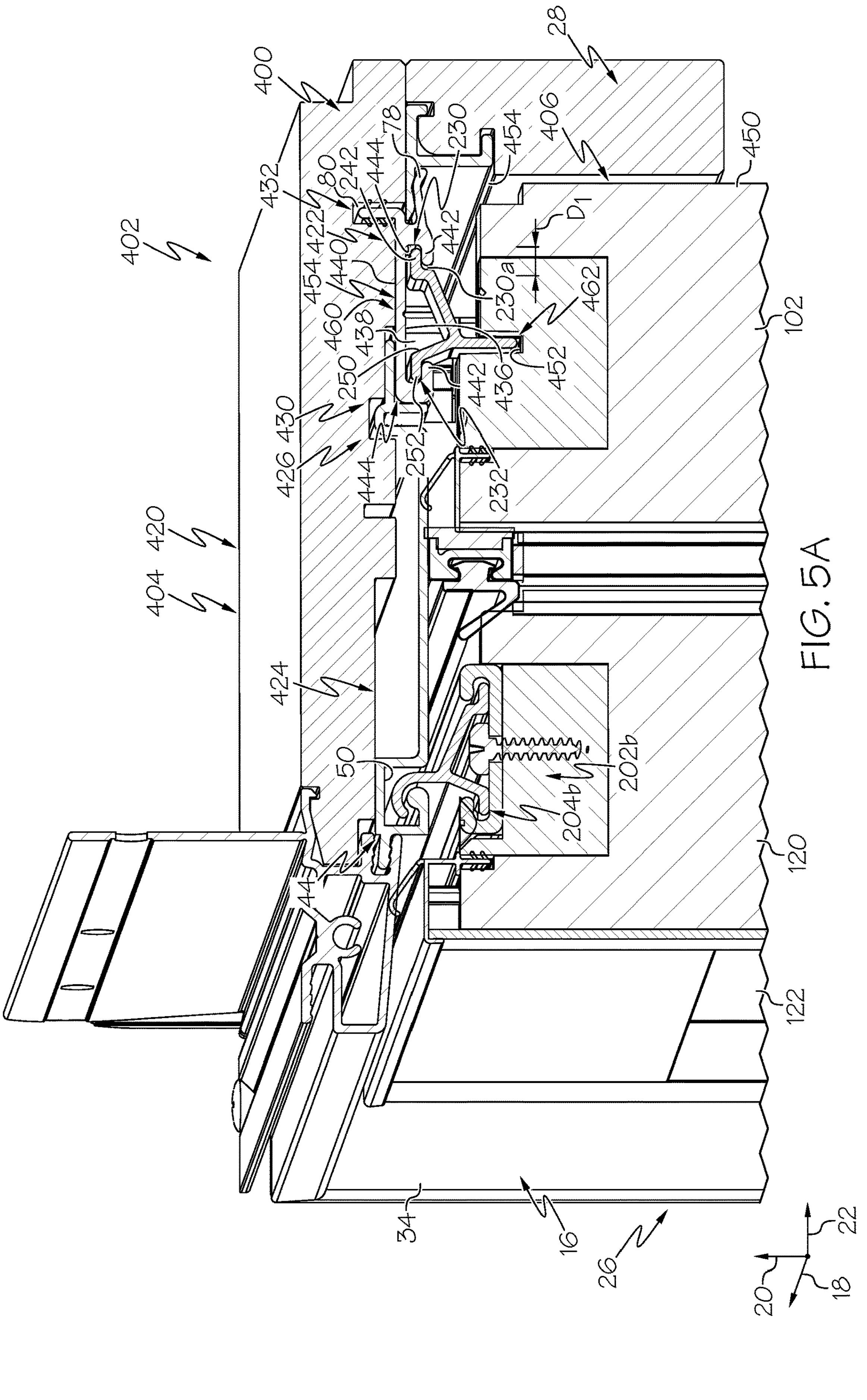
FIG. 5A is a cross-sectional view of another exemplary fenestration unit, which includes a sash retention system, a first sash frame and the second sash frame, taken from the perspective of line 3A-3A of FIG. 1.
Figure 5B:
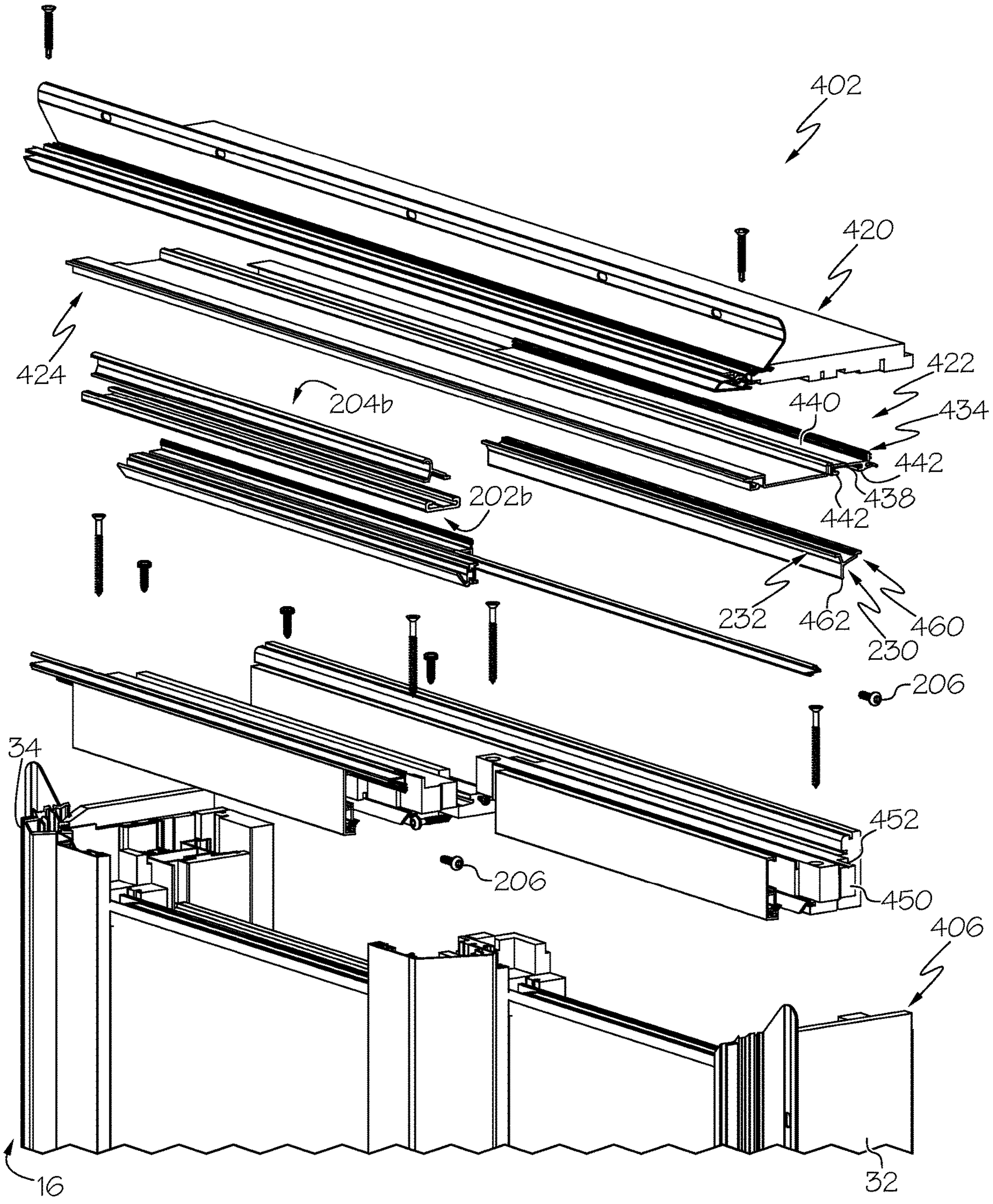
FIG. 5B is a partially exploded view of a portion of the fenestration unit of FIG. 5A.

It should be noted that while the sash retention system 200 has been discussed with regard to FIGS. 1-4 as having the same retention system for the fixed, first sash 14 and the movable, second sash 16, other configurations may be employed to couple the fixed, first sash 14 to the fenestration frame 12. For example, with reference to FIGS. 5A and 5B, a sash retention system 400 for use with a fenestration unit 402 is shown. As the sash retention system 400 and the fenestration unit 402 include features that are the same or similar to the sash retention system 200 and the fenestration unit 10 discussed with reference to FIGS. 1-4B, the same reference numerals will be used to denote the same or similar components. In this example, the fenestration unit 402 is also a sliding window, such as a horizontal sliding window. It should be noted, however, that the teachings discussed herein may be applicable to other types of fenestration units, including, but not limited to horizontal sliding doors, etc. Also, the fenestration unit 402 may be a clad window, however, the fenestration unit 10 may have a different configuration. In this example, the fenestration unit 402 includes a fenestration frame 404, a fixed, first sash 406 and the movable, second sash 16. The fenestration frame 404 supports the first sash 406 and the second sash 16. The first sash 406 is a fixed, non-active sash that is fixedly supported within the fenestration frame 404 and is immovable relative to the fenestration frame 404. The second sash 16 is the sliding sash that is supported within the fenestration frame 404 for sliding movement along the horizontal axis 18. The sashes 406, 16 are supported within the fenestration frame 404 and are offset along the interior/exterior axis 22 such that the second sash 16 overlaps the first sash 406. When the fenestration unit 402 is coupled to a structure, such as the building 24 (FIG. 1), the exterior side 26 of the fenestration unit 402 is disposed on the exterior 24*a* of the building 24, while the interior side 28 of the fenestration unit 402 is disposed in the interior 24*b* of the building 24.

Figure 6:
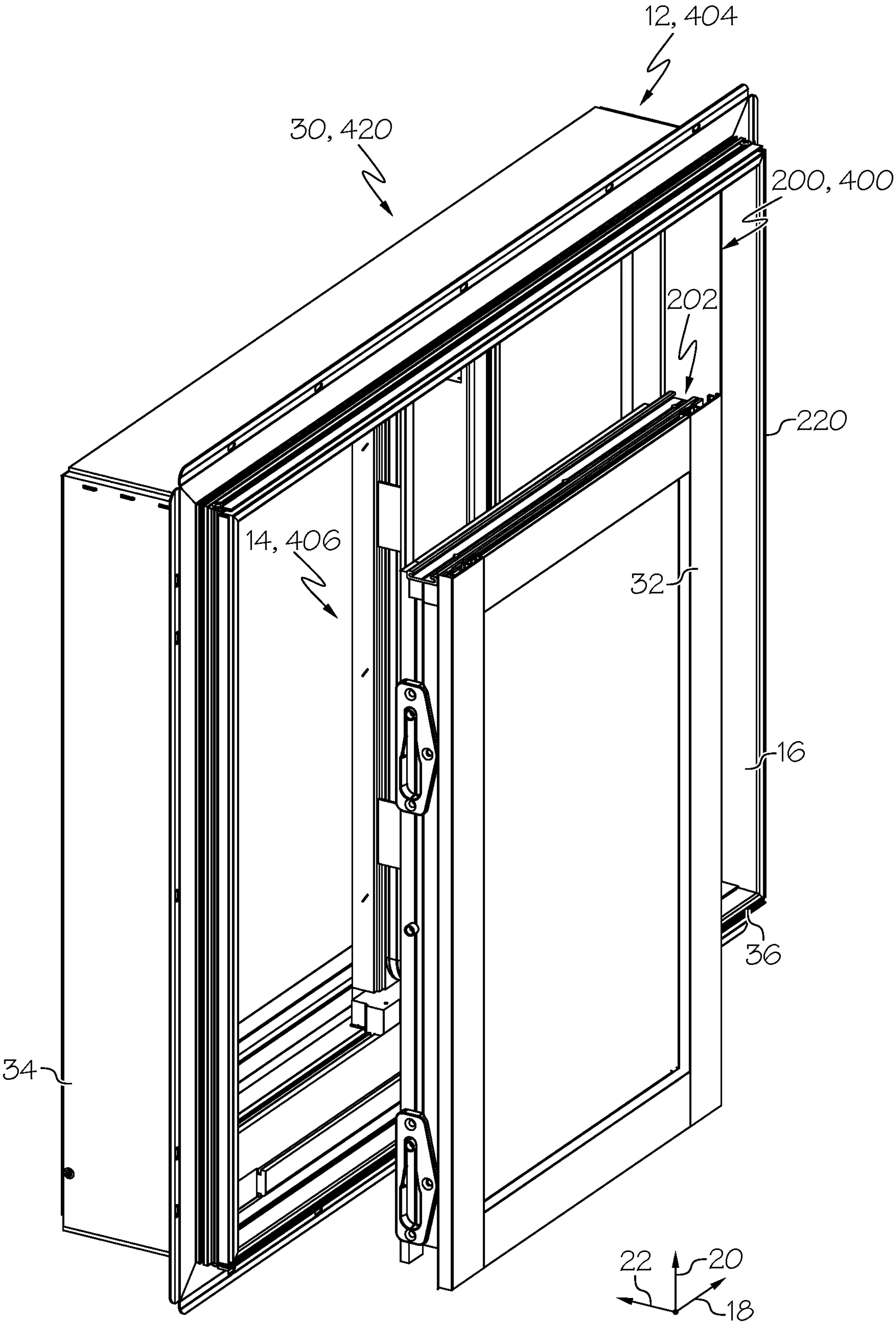
FIG. 6 is a schematic illustration of the second sash frame removed from the fenestration unit by uncoupling a portion of the sash retention system from the fenestration frame and the second sash frame.

In this example, the fenestration frame 404 is rectangular, and includes a head 420, the first jamb 32 (FIG. 6), the second jamb 34 (FIG. 6) and the sill 36 (FIG. 6). The head 420 is opposite the sill 36. The head 420 and sill 36 extend along the horizontal axis 18 and may be separated or spaced apart along the vertical axis 20. In one example, the sash retention system 400 is coupled between the head 420 and each of the sashes 406, 16. By coupling the sash retention system 400 to the head 420, the sashes 406, 16 may be released from the head 420, rotated along the interior/exterior axis 22 and removed from the fenestration frame 404. Thus, the sash retention system 400 enables easy removal of the sashes 406, 16 from the fenestration frame 404.

The head 420 includes the first frame member 422 and a second frame member 424. The first frame member 422 is composed of a metal, metal alloy or composite based material, and is extruded. The first frame member 422 is coupled to the head 420 so as to extend along the head 420 from the first jamb 32 (FIG. 2) to the second jamb 34. Thus, generally, the first frame member 422 extends along the horizontal axis 18 of the fenestration frame 12. The first frame member 422 includes the first end 44 and an opposite second end 426 that are spaced apart about the interior/exterior axis 22. The first frame member 422 includes the frame body portion 60 that is substantially planar, and is coupled to or integrally formed with the first end 44 and the second end 426. The second end 426 includes the seal coupling slot 62 to receive the seal assembly 66 associated with the fenestration frame 404.

The second frame member 424 is composed of a metal, metal alloy or composite based material, and is extruded. The second frame member 424 is coupled to the head 420 so as to extend along the head 420 from the first jamb 32 (FIG. 2) to the second jamb 34. Thus, generally, the second frame member 424 extends along the horizontal axis 18 of the fenestration frame 404. The second frame member 424 includes a third end 430 and an opposite fourth end 432 that are spaced apart about the interior/exterior axis 22. The second frame member 424 defines a retainer base 434 between the third end 430 and the fourth end 432. The second frame member 424 defines a base surface 436 between the third end 430 and the fourth end 432. The base surface 436 is substantially planar, and includes a first base side 438 opposite a second base side 440 in the vertical axis 20. The second base side 440 is coupled to and in contact with the head 420.

The third end 430 and the fourth end 432 include opposing retainer flanges 442. The retainer flanges 442 cooperate with the first base side 438 to define opposing retainer channels 444 that receive a portion of the sash retention system 400. Generally, the retainer flanges 442 are sized to enable the portion of the sash retention system 400 to move or slide within the retainer channels 444 defined by the retainer flanges 442 along the first base side 438 in order to remove the first sash 406. The retainer flanges 412 cooperate with the first base side 438 to define the retainer channel 444, which is substantially C-shaped, at the third end 430 and the fourth end 432. Each of the retainer flanges 442 extends for the distance D1 over a portion of the first base side 438 to couple the portion of the sash retention system 400 to the second frame member 424. The fourth end 432 also defines the coupling arm 78 and the coupling flange 80.

With reference back to FIG. 2, the first sash 406 includes a first sash frame 450 and the first glazing unit 102. The first glazing unit 102 of the first sash 406 is supported by the first sash frame 450, and the first sash frame 450 is fixed relative to the fenestration frame 404. In this example, the first sash frame 450 includes a retainer channel 452, which extends along the horizontal axis 18 at a first sash end 454 of the first sash frame 450 and is centered along the first sash end 454. The first sash end 454 is defined on the first sash frame 450 so as to be coupled to the head 420 by the sash retention system 400 when the first sash 406 is coupled to the fenestration frame 404. It should be noted that the first sash 406 may also include additional features that are outside of the scope of the present disclosure, including, but not limited to, one or more seals, operator handles, etc.

The sash retention system 400 enables the first sash 406 and the second sash 16 to be removed from the fenestration frame 404. As discussed, the sash retention system 400 is different between the fixed, first sash 406 and the movable, second sash 16. In this example, the sash retention system 400 includes the retainer base 202*b*, the retainer 204*b*, a fixed sash retainer 460 and the plurality of retention fasteners 206 (FIG. 2). The retainer base 202*b* and the retainer 204*b* are associated with the second sash frame 120 of the second sash 16. The fixed sash retainer 460 couples or interconnects the first sash frame 450 to the second frame member 424. The fixed sash retainer 460 is composed of metal, metal alloy or polymer-based material, including, but not limited to, aluminum, aluminum alloy or polyvinyl chloride; and may be extruded, molded, additively manufactured, etc. In one example, the fixed sash retainer 460 includes the first retainer arm 230, the second retainer arm 232 and a third retainer arm 462. Generally, the fixed sash retainer 460 has a length along the horizontal axis 18, which is different and less than a length of the retainer base 434 along the horizontal axis 18 to enable the retention fasteners 206 to couple the fixed sash retainer 460 to the retainer base 434. For example, the fixed sash retainer 460 has a length that is about 250 millimeters (mm) to about four inches (in.) less than a length of the retainer base 434.

Each of the first retainer arm 230, the second retainer arm 232 and the third retainer arm 462 extend axially along the fixed sash retainer 460 from a first retainer side to an opposite second retainer side. The first retainer arm 230 is coupled to or integrally formed with the second retainer arm 232 and the third retainer arm 462. The first retainer arm 230 extends outwardly along the interior/exterior axis 22 from an intersection of the second retainer arm 232 and the third retainer arm 462. The first tab 242 of the first retainer arm 230 is sized to be received within the retainer channel 444 defined by the retainer flange 442 of the second frame member 424 and extends for a length that is about equal to the distance D1. In one example, the first retainer arm 230 also includes the notch 230*a*, which is sized to contact the retainer flange 442 to limit a movement of the fixed sash retainer 460 along the interior/exterior axis 22. The second tab 252 of the second retainer arm 232 is sized to be received within the retainer channel 444 defined by the retainer flange 442 of the second frame member 424 and extends for a length that is about equal to the distance D1. In one example, the retainer flange 442 contacts the second angled portion 250 to limit a movement of the fixed sash retainer 460 along the interior/exterior axis 22. The third retainer arm 462 extends downward, along the vertical axis 20, from the intersection of the first retainer arm 230 and the second retainer arm 232. The third retainer arm 462 is planar, and is sized to be received in the retainer channel 452 of the second frame member 42 to couple the first sash frame 450 to the head 420.

A respective pair of the plurality of retention fasteners 206 is coupled to a respective one of the retainer bases 202*b*, 434. In certain examples, the pair of retention fasteners 206 associated with the retainer base 434 may be optional. The retention fasteners 206 bias against the respective retainer 204*b*, 460 to inhibit the respective retainer 204*b*, 460 from being removed from the respective retainer base 202*a*, 434. In one example, the sash retention system 400 includes four retention fasteners 206. The retention fastener 206 is coupled to the retainer flange 212, 442 which secures the retainer 204*b*, 460 within the respective retainer base 202*b*, 434. In one example, the retention fasteners 206 are coupled to the retainer base 202*b* so as to be in contact with the second retainer arm 232, however, since the retainer flanges 212, 442 are the same, the retention fasteners 206 may alternatively be coupled to the retainer base 202*b*, 434 so as to be in contact with the first retainer arm 230. Generally, the retention fasteners 206 are coupled to the retainer base 202*b*, 434 at opposed ends of the retainer base 202*b*, 434 so as to retain the retainer 204*b*, 460 on opposed sides along the horizontal axis 18. As will be discussed, one of the retention fasteners 206 may be removed from the respective retainer flange 212, 442, which enables the respective retainer 204*b*, 460 to be removed from the respective retainer base 202*b*, 434 and the respective first frame member 40 and the second frame member 424, which enables the respective one of the first sash frame 450 and the second sash frame 120 to be removed from the fenestration frame 404. Thus, the retention fasteners 206 enable selective removal of the retainer 204*b*, 460 from the respective one of the retainer bases 202*b*, 434, thereby releasing the respective one of the first sash frame 450 and the second sash frame 120 from the fenestration frame 404.

In one example, with additional reference to FIG. 2, in order to assemble the fenestration unit 10, 402, the first frame member 40 and the second frame member 42, 424 are coupled to the head 30, 420. The retainer base 202*a* is coupled to the first retainer groove 104 of the first sash 14, and the retainer base 202*b* is coupled to the second retainer groove 124 of the second sash 16 with the mechanical fasteners 220. With the fenestration frame 12, 404 assembled such that the head 30, 420 is coupled to the first jamb 32, the second jamb 34 and the sill 36 (FIG. 2), and the first sash 14, 406 and the second sash 16 assembled, the first sash 14, 406 and the second sash 16 are coupled to the fenestration frame 12, 404. In the example of the first sash 14 (FIG. 2), with the first sash 14 positioned such that the retainer base 202*a* is aligned along the vertical axis 20 with the second channel 88, the retainer 204*a* is slid onto the retainer base 202*a* such that the first retainer arm 230 and the second retainer arm 232 engage the retainer channels 226, and the hook 260 of the third retainer arm 234 is positioned over the bulbous end 96*a* of the second channel 88. The retainer 204*a* is advanced in the retainer base 202*a* until the retainer 204*a* is received wholly within the retainer base 202*a* and the second channel 88. The retention fastener 206 is coupled to the retainer channel 226 of the retainer base 202*a* to secure and retain the retainer 204*a* within the retainer base 202*a* and the second channel 88.

In the example of the first sash 406 (FIGS. 4A and 4B), with the first sash 406 positioned such that the retainer base 434 is aligned along the vertical axis 20 with the retainer channel 452, the fixed sash retainer 460 is slid onto the retainer base 434 such that the first retainer arm 230 and the second retainer arm 232 engage the retainer channels 444, and the third retainer arm 462 is received in the retainer channel 452. The fixed sash retainer 460 is advanced in the retainer base 434 until the fixed sash retainer 460 is received wholly within the retainer base 434 and the retainer channel 452. The retention fastener 206 is coupled to the retainer channel 444 of the retainer base 434 to secure and retain the fixed sash retainer 460 within the retainer base 434 and the retainer channel 452.

In the example of the second sash 16 (FIG. 2), with the second sash 16 positioned such that the retainer base 202*b* is aligned along the vertical axis 20 with the first channel 50, the retainer 204*b* is slid onto the retainer base 202*b* such that the first retainer arm 230 and the second retainer arm 232 engage the retainer channels 226, and the hook 260 of the third retainer arm 234 is positioned over the bulbous end 58*a* of the first channel 50. The retainer 204*b* is advanced in the retainer base 202*b* until the retainer 204*b* is received wholly within the retainer base 202*b* and the first channel 50. The retention fastener 206 is coupled to the retainer channel 226 of the retainer base 202*b* to secure and retain the retainer 204*b* within the retainer base 202*b* and the first channel 50.

With the first sash 14, 406 and the second sash 16 coupled to the fenestration frame 12, 404, the operator may move the second sash 16 along the horizontal axis 18 between various positions. With the second sash 16 coupled to the retainer base 202*b* and the first channel 50, since the first channel 50 extends the length of the head 30 along the horizontal axis 18, the retainer 204*b* of the sash retention system 200, 400 enables the movable, second sash 16 to move relative to the fixed, first sash 14, 406 and the fenestration frame 12, 404 along the first channel 50. In certain instances, the operator may desire to remove the second sash 16 and/or the first sash 14, 406, for cleaning, maintenance, etc. In the example of the second sash 16, the operator removes one of the retention fasteners 206 from the retainer channel 226 of the retainer base 202*b*. The operator grasps the retainer 204*b*, and slides the retainer 204*b* relative to the retainer base 202*b* and the first channel 50 to withdraw or remove the retainer 204*b* from the retainer base 202*b* and the first channel 50. With the retainer 204*b* removed, with reference to FIG. 6, the second sash 16 is uncoupled from the fenestration frame 12, 404, and may be rotated away from the fenestration frame 12, 404 and lifted outward from the fenestration frame 12, 404 to remove the second sash 16 from the fenestration frame 12, 404.

With reference to FIGS. 3A-3C, in order to remove the first sash 14, the operator removes one of the retention fasteners 206 from the retainer channel 226 of the retainer base 202*a* if employed. The operator grasps the retainer 204*a*, and slides the retainer 204*a* relative to the retainer base 202*a* and the second channel 88 to withdraw or remove the retainer 204*a* from the retainer base 202*a* and the second channel 88. With the retainer 204*a* removed, the first sash 14 is uncoupled from the fenestration frame 12, and may be rotated away from the fenestration frame 12 and lifted outward from the fenestration frame 12 to remove the first sash 14 from the fenestration frame 12. Referring to FIG. 4, in order to remove the first sash 406, the operator removes one of the retention fasteners 206 from the retainer channel 444 of the second frame member 424 if employed. The operator grasps the fixed sash retainer 460, and slides the fixed sash retainer 460 relative to the retainer base 434 and the retainer channel 452 to withdraw or remove the fixed sash retainer 460 from the retainer base 434 and the retainer channel 452. With the fixed sash retainer 460 removed, the first sash 406 is uncoupled from the fenestration frame 404, and may be rotated away from the fenestration frame 404 and lifted outward from the fenestration frame 404 to remove the first sash 406 from the fenestration frame 404.

Thus, the sash retention system 200, 400 enables the first sash frame 100, 450 of the first sash 14 and the second sash frame 120 of the second sash 16 to be removably coupled to the fenestration frame 12, 404 such that the first sash 14 and the second sash 16 are easily removed for cleaning, maintenance, etc. Further, the sash retention system 200, 400 has a low profile, and is compact. In addition, the use of the retention fasteners 206 to retain the retainers 204 enables the selective removal of the retainer 204 from the channels 50, 88 and the retainer base 202. The use of the retention fasteners 206 to retain the fixed sash retainer 460 also enables the selective removal of the fixed sash retainer 460 from the retainer channel 452 and the retainer base 434. In addition, the use of the retainer 204 with the hook 260 enables the sashes 14, 16 to bow or rotate slightly along the interior/exterior axis 22 when experiencing a pressure differential, for example, while inhibiting an inadvertent uncoupling of the sash frame 100, 120 from the fenestration frame 12, 404. It should be noted that while the retainers 204 are described and illustrated herein as being one-piece, a retainer associated with the sash retention system 200, 400 may include multiple pieces.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A fenestration unit, comprising:
- a fenestration frame with a first frame member;
- a sash including a sash frame configured to support a glazing unit;
- a channel defined in the first frame member that extends along a first axis, the channel including a terminal end;
- a retainer base associated with the sash frame that extends along the first axis; and
- a retainer removably coupled to the first frame member and the sash frame to removably retain the sash frame on the fenestration frame, the retainer having a first retainer arm, a second retainer arm and a third retainer arm, the third retainer arm movably coupled to the channel and the first retainer arm movably coupled to the retainer base, the terminal end cooperating with the third retainer arm to enable the sash to move relative to a second axis while coupled to the fenestration frame.

2. The fenestration unit of claim 1, wherein the retainer base defines opposed retainer channels, and the first retainer arm and the second retainer arm are coupled to a respective one of the opposed retainer channels.

3. The fenestration unit of claim 1, wherein the third retainer arm defines a hook to engage with the terminal end of the wall.

4. The fenestration unit of claim 3, wherein the terminal end of the wall of the channel includes a bulbous portion to engage with the hook of the third retainer arm.

5. The fenestration unit of claim 1, wherein the third retainer arm is substantially planar.

6. The fenestration unit of claim 1, wherein the fenestration unit includes a second frame member and a second sash frame, the second frame member includes a second channel that extends along the first axis, the second sash frame includes a second retainer base and a second retainer is removably coupled to the second frame member and the second sash frame to removably retain the second sash frame on the fenestration frame.

7. The fenestration unit of claim 1, wherein the fenestration frame includes a head, a sill and a pair of jambs that interconnect the head to the sill, and the first frame member is coupled to the head of the fenestration frame.

8. The fenestration unit of claim 1, further comprising a retention fastener configured to enable selective removal of the retainer from the channel and the retainer base to thereby release the sash from the fenestration frame, and the retention fastener is coupled to the retainer base to retain the retainer within the channel.

9. A fenestration unit, comprising:

a fenestration frame with a first frame member that defines a channel that extends along a first axis;

a sash having a sash frame including a retainer base that extends along the first axis, the retainer base defining opposed retainer channels;

a retainer removably coupled to the first frame member and the sash frame to removably retain the sash frame on the fenestration frame, the retainer having a first retainer arm, a second retainer arm and a third retainer arm, the third retainer arm movably coupled to the channel, and the first retainer arm and the second retainer arm movably coupled to a respective one of the opposed retainer channels of the retainer base; and a retention fastener configured to enable selective removal of the retainer from the channel and the retainer base to thereby release the sash from the fenestration frame.

10. The fenestration unit of claim 9, wherein the channel includes a wall having a terminal end that cooperates with the third retainer arm to enable the sash to move relative to a second axis while coupled to the fenestration frame.

11. The fenestration unit of claim 10, wherein the third retainer arm defines a hook to engage with the terminal end of the wall.

12. The fenestration unit of claim 11, wherein the terminal end of the wall of the channel includes a bulbous portion to engage with the hook of the third retainer arm.

13. The fenestration unit of claim 9, wherein the fenestration frame includes a head, a sill and a pair of jambs that interconnect the head to the sill, and the first frame member is coupled to the head of the fenestration frame.

14. The fenestration unit of claim 9, wherein the sash frame is coupled to the fenestration frame by the retainer and the sash is immovable relative to the fenestration frame.

15. The fenestration unit of claim 9, wherein the sash frame is coupled to the fenestration frame by the retainer and the sash is movable relative to the fenestration frame.

16. A fenestration unit, comprising:

a fenestration frame with a first frame member;

a first sash including a first sash frame configured to support a glazing unit;

a first channel defined in one of the first frame member and the first sash frame that extends along a first axis;

a first retainer base associated with the other of the first frame member and the first sash frame that extends along the first axis;

a first retainer removably coupled to the first frame member and the first sash frame to removably retain the first sash frame on the fenestration frame, the first retainer having a first retainer arm, a second retainer arm and a third retainer arm, the third retainer arm movably coupled to the first channel and the first retainer arm movably coupled to the first retainer base;

a second frame member and a second sash frame, the second frame member including a second channel that extends along the first axis, the second sash frame including a second retainer base; and a second retainer removably coupled to the second frame member and the second sash frame to removably retain the second sash frame on the fenestration frame.

17. The fenestration unit of claim 16, wherein the first sash frame is coupled to the fenestration frame by the first retainer and the first sash is immovable relative to the fenestration frame.

18. The fenestration unit of claim 16, wherein the first sash frame is coupled to the fenestration frame by the first retainer and the first sash is movable relative to the fenestration frame.

19. The fenestration unit of claim 16, wherein the third retainer arm defines a hook, and wherein the first channel is defined by a bulbous portion to engage with the hook.

20. The fenestration unit of claim 16, further comprising a retention fastener configured to enable selective removal of the first retainer from the first channel and the first retainer base to thereby release the first sash from the fenestration frame, and the retention fastener is coupled to the first retainer base to retain the first retainer within the first channel.

* * * * *